United States Patent [19]

Philip

[11] Patent Number: 4,625,292

[45] Date of Patent: Nov. 25, 1986

[54] MANUAL ENTRY RATE CALCULATOR HAVING CONTINUOUS UPDATING CAPABILITY

[75] Inventor: James H. Philip, Chestnut Hill, Mass.

[73] Assignee: The Massachusetts General Hospital, Boston, Mass.

[21] Appl. No.: 739,492

[22] Filed: May 30, 1985

Related U.S. Application Data

[63] Continuation of Ser. No. 512,696, Jul. 11, 1983, abandoned, which is a continuation of Ser. No. 138,312, Apr. 8, 1980, abandoned.

[51] Int. Cl.[4] .................. G06F 15/36; G01R 23/02; G06M 3/00
[52] U.S. Cl. ............................... 364/569; 364/734; 377/20; 377/49
[58] Field of Search ............ 377/20, 47, 49, 55, 377/118; 368/70, 10, 110–113, 224, 251; 364/575, 569, 734

[56] References Cited

U.S. PATENT DOCUMENTS

| | | | |
|---|---|---|---|
| Re. 29,921 | 2/1979 | Cherry et al. | 364/900 |
| 3,541,311 | 11/1970 | Taylor | 235/92 TF |
| 3,578,960 | 5/1971 | Georgi | 235/92 CD |
| 3,852,575 | 12/1974 | Daniels | 235/92 T |
| 3,859,512 | 1/1975 | Ritzinger | 235/92 T X |
| 4,009,371 | 2/1977 | Hamilton | 235/92 CP X |
| 4,027,146 | 5/1977 | Gilmore | 235/92 P X |
| 4,093,850 | 6/1978 | Karnowski | 235/92 TF |
| 4,133,039 | 1/1979 | Eichenlaub | 364/575 X |
| 4,256,953 | 3/1981 | Allen | 235/92 T |
| 4,257,005 | 3/1981 | Hall | 235/92 FQ X |
| 4,399,354 | 8/1983 | Schaeffer | 377/20 X |

*Primary Examiner*—James D. Thomas
*Assistant Examiner*—David L. Clark
*Attorney, Agent, or Firm*—Weingarten, Schurgin, Gagnebin & Hayes

[57] ABSTRACT

A rate calculator for calculating, displaying and continuously updating the rate of occurrence of events. Manually entered signals indicative of the occurrence of an observed event trigger a resettable counter for counting the number of events. A clock is activated by the first entry signal for measuring the time duration from the first entry and a processor responds to the counter and the clock for cumulatively calculating the rate of occurrence of each event from the second event on. A display of the calculated rate is provided for visual perception.

9 Claims, 1 Drawing Figure

4,625,292

MANUAL ENTRY RATE CALCULATOR HAVING CONTINUOUS UPDATING CAPABILITY

This application is a continuation of application Ser. No. 512,696, filed July 11, 1983, now abandoned, which is a continuation of Ser. No. 138,312, filed Apr. 8, 1980, now abandoned.

FIELD OF THE INVENTION

The present invention relates to rate calculators and, in particular, to a rate calculator for calculating, displaying and continuously updating the time rate of occurrence of manual entries corresponding to observed events.

BACKGROUND OF THE INVENTION

Rate of occurrence measurements based upon the observation of discrete events are useful in many fields. In medicine and health care, for example, knowledge of a patient's heartbeat rate, respiration rate, and intravenous solution drip rate are all important parameters commonly monitored as indica of the condition and treatment efficiency. In time-motion studies, the rate at which various manufacturing operations are performed is central to many analyses.

Conventional methods of making rate measurements are less than satisfactory particularly when used by process or medical personnel who cannot be burdened with complex instrumentation. In the usual approach, an observer with a time piece counts the number of occurrences in a given time interval, e.g., the number of heartbeats in sixty seconds. The disadvantage of this approach, however, is that it is inaccurate and time-consuming. Its accuracy is limited to about ±0.4 events in any given time interval, and little perceptible information is obtained until expiration of the chosen time interval. In addition, the observer's attention is diverted to the measurement function for a long time period and often a mental calculation is required at the end of the observation.

Alternative approaches involve the use of dedicated instruments specifically designed to detect and count the occurrence of a specific event. Aside from their inherent inflexibility, these instruments also are relatively slow and provide no information until the expiration of a chosen time interval, or until after the occurrence of a specified number of events.

SUMMARY OF THE INVENTION

In accordance with the present invention, a rate calculator is provided for calculating, displaying and continuously updating the rate of occurrence of events. The calculator comprises a manually activated switch used to provide signals indicative of the occurrence of an observed event. A resettable counter responds to the switch signal to count and store the number of event representing signals. An electronic clock is activated by the first entry signal and records the time from the first signal. A processor responds to the counter and the clock for successively computing the cumulative rate of events for each event beginning with the second event. The computed rate is then displayed.

BRIEF DESCRIPTION OF THE DRAWING

The nature, advantages and various additional features of the invention will appear more fully upon consideration of the illustrative and solely exemplary embodiments now to be described in detail in connection with the accompanying drawing, which is a block diagram of a rate calculator in accordance with the invention.

DETAILED DESCRIPTION

Figure 1:
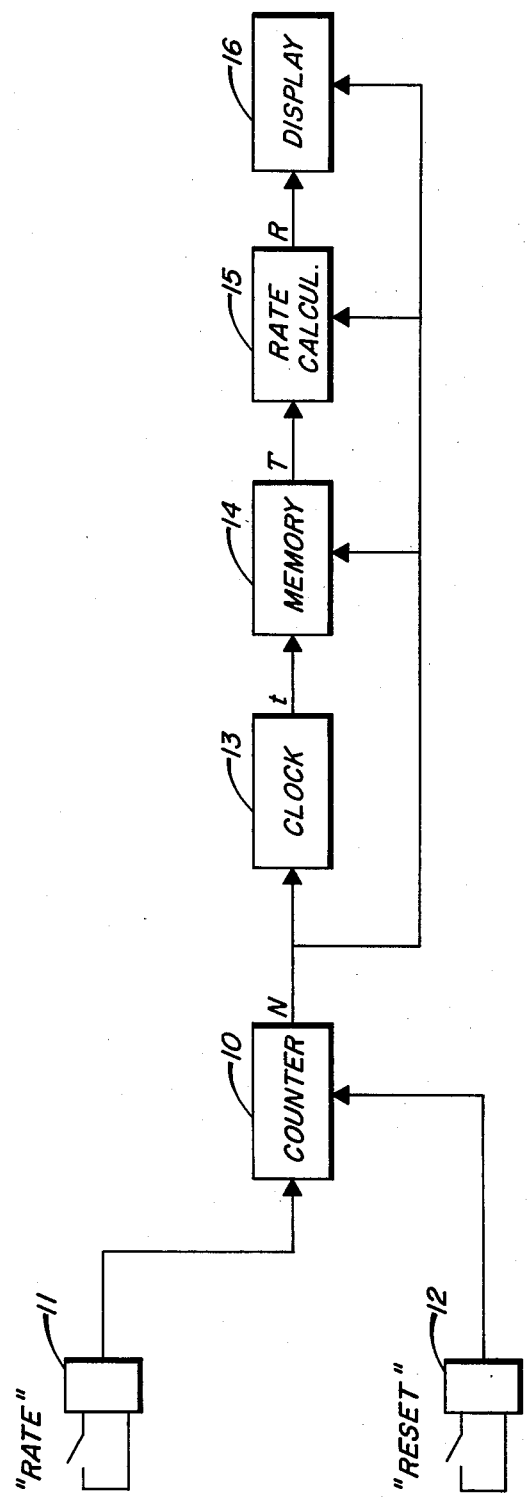

Referring to the drawing, FIG. 1 illustrates a rate calculator comprising a counter 10, which may include a plurality of cascaded counters, with its input and reset terminals connected to a pair of "bounceless" normally-open switches, 11 and 12, respectively. Counter 10 advances a digital count, N, from 0 to 1,2 . . . for each successive closure of switch 11. Switch 12 returns the counter 10 to $N=0$ upon closure.

The output state N of the counter 10 is coupled to a clock 13, such as an oscillator driven counter, which commences counting at a preselected rate at the appearance of the $N=1$ state of counter 10, indicative of elapsed time from the time of the first entry into the counter 10. The elapsed time output of clock 13 is conveniently stored for example in seconds, in a memory 14, typically a digital storage register, for subsequent application to a processor circuit 15, such as an arithmetic-logic unit as known in the art. Memory 14 stores the current value in clock 13 at the appearance of each N signal from counter 10 for N greater than or equal to 2.

The processor circuit 15 comprises an arithmetic logic unit organized by soft or hard wired arrangement to provide the computation $$R = 60(N-1)/T$$

where N is the number of events provided by counter 10 and T is the elapsed time in seconds as stored in memory 14, and R is the rate of occurrence of events in events per minute. Processor may perform the calculation with a multiplicative scaling factor, K, such that the result RK, represents event rate or units of multiple events per any desired time interval.

The calculator output R is applied to a display 16, which can conveniently comprise a series of seven segment displays. Display 16 transforms and stores the digital output R for appropriate segment activation to provide a decimal equivalent display of R. Because of the rapid processing rate of such circuitry, the number displayed is nearly instantaneously updated with the entry of the corresponding event indication.

Processor 15 may be further programmed to provide greater weight to the later intervals than the earlier ones by replacing the calculation above with $$R = 60 \Sigma A_j / \Sigma A_j T_j$$

where the $A_j$s are weighting factors starting below one and ending above one and $T_j$ are time intervals between j events. The summations proceed from $j=1$ to $N-1$.

The advantages of this rate calculator are manifold. Because it provides for manual entry, it is usable for providing rate calculations of a wide variety of occurrences observable by a human operator. Moreover, it provides calculations almost immediately upon the entry of occurrences and obtains successively more accurate approximations as the number of entries increases. In addition, any individual operational error causing, for example, a lengthened time interval between two event times is corrected naturally by a compensatory shortening of the subsequent interval. The user is free to stop his reading when the desired level of accuracy has been reached.

It is contemplated that, with techniques now available, the bulk of the circuitry required for this device can be fabricated in a single integrated circuit and the entire device can be incorporated into a convenient form similar to a digital wrist watch, a stopwatch, a hand-held calculator, or any other device present in the environment in which event rate is to be measured. This includes but is not limited to physiological monitors, electronic thermometers, and intravenous infusion controllers.

Optionally, the reset function of the counter 10 may be supplemented or replaced by an automatic reset signal from the rate calculator 15 effected by detection of a large change in rate from event to event using standard sample comparison techniques. This would permit the use of only one instrument button with reset accomplished by rapid activation of the event entry button or simply upon the cesssation of event inputs.

While the invention has been described in connection with a preferred embodiment, it is to be understood that this is merely illustrative of the many other specific embodiments which can also utilize the principles of the invention. Thus numerous and varied devices can be made by those skilled in the art without departing from the spirit and scope of the present invention.

What is claimed is:

1. A rate calculator for calculating, displaying and updating the rate of occurrence of observable events, said calculator comprising:

switch means for manually entering a signal upon observation of the occurrence of each observable event;

counter means responsive to each of said signals of said switch means for counting entered signals to provide a sequence of a first, second and further event indicative signals;

clocked means responsive to the first event indicative signal and successively responsive to the second and further event indicative signals from said counter means for successively providing a corresponding one of plural lapsed time signals respectively representing accumulated total time duration from said first event indicative signal successively to each of said second and further event indicative signals;

processor means successively responsive to individual ones of the plural elapsed time signals representing accumulated total time duration of said clocked means and to the corresponding one of the numeric sequence of said first, second and further event indicative signals of said counter means for computing a running average representative of the rate of occurrence of said event indicative signals, for each event indicative signal beyond the first, using individual ones of said plural elapsed time signals corresponding to each event signal beyond the first, so as to provide plural running average signals respectively representative of rate of occurrence of each of said event indicative signals beyond the first, the most recent of said plural running average signals is retained as a final average until further operator activation of the switch means; and display means responsive to the computed rate of occurrence of event indicative signals for displaying said computed rate as the rate of occurrence of said events for each event beyond the first;

said display means displaying an updated rate of occurrence after and only after each signal entered by said switch means beyond the first whereby each running average signal is retained and displayed as the final average until activation of the switch means.

2. A rate calculator according to claim 1 wherein said switch means comprises a "bounceless" normally-open switch for the manual entry of signals indicative of the occurrence of observed events.

3. A rate calculator according to claim 1 wherein said counter includes a resettable counter and switch means are provided to reset said counter to a count representative of no event indicative signals.

4. A rate calculator according to claim 1 further including means for storing, between event indicative signals, a time representing signal present in said clocked means at the preceding event indicative signal.

5. A rate calculator according to claim 1 or 4 wherein said processor includes means for computing the rate of occurrence as the ratio $$K(N-1)/T$$

where N is the number of event indicative signals provided by said counter means, T is the time accumulated by said clocked means, and K is a factor imparting scale to time and forming a part of the functions of said processor.

6. A rate calculator according to claim 5 wherein K is 60.

7. A rate calculator according to claim 1 wherein said means for displaying displays an updated rate of occurrence after each event indicative signal beginning with the second event indicative signal.

8. A rate calculator, according to claim 1 wherein said processor includes means for computing the rate of occurrence as the function of j events for j=1 to N−1

$$K\Sigma A_j/\Sigma A_j T_j$$

where $A_1, A_2 \ldots A_j$s are weighting factors forming a part of the functioning of said processor and each $T_j$ is a time interval provided by said clocked means representing time between corresponding events and K is a factor imparting scale to time and forming a part of the functioning of said processor.

9. A rate calculator according to claim 1 wherein said counter includes a resettable counter and said processor is operative to detect a change in the value of computed rate between event indication signals and to reset said counter in response thereto.

* * * * *